(12) United States Patent
Roberts et al.

(10) Patent No.: US 8,839,290 B2
(45) Date of Patent: Sep. 16, 2014

(54) METHODS AND SYSTEMS FOR GENERATING A PERSONALIZED VERSION OF A MEDIA CONTENT PROGRAM FOR A USER

(75) Inventors: Brian F. Roberts, Dallas, TX (US); Harpal S. Bassali, San Francisco, CA (US); Sudhanshu Sharma, Coppell, TX (US); Donald H. Relyea, Dallas, TX (US); Raul I. Aldrey, Plano, TX (US); Japan A. Mehta, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 570 days.

(21) Appl. No.: 12/797,794

(22) Filed: Jun. 10, 2010

(65) Prior Publication Data

US 2011/0307924 A1    Dec. 15, 2011

(51) Int. Cl.
| | |
|---|---|
| *H04N 21/258* | (2011.01) |
| *H04N 21/262* | (2011.01) |
| *H04N 21/442* | (2011.01) |
| *H04N 21/458* | (2011.01) |
| *G06Q 30/02* | (2012.01) |
| *H04N 21/45* | (2011.01) |
| *H04N 21/2668* | (2011.01) |
| *H04N 21/8541* | (2011.01) |
| *H04N 21/845* | (2011.01) |
| *H04N 5/445* | (2011.01) |
| *H04N 21/475* | (2011.01) |

(52) U.S. Cl.
CPC ........... *H04N 5/44543* (2013.01); *G06Q 30/02* (2013.01); *H04N 21/4532* (2013.01); *H04N 21/2668* (2013.01); *H04N 21/8541* (2013.01); *H04N 21/4755* (2013.01); *H04N 21/8456* (2013.01)
USPC .................. 725/34; 725/46; 725/47; 725/49; 725/132

(58) Field of Classification Search
CPC ..................................... H04N 21/251
USPC ...................................... 725/34, 46
See application file for complete search history.

(56) References Cited

U.S. PATENT DOCUMENTS

| | | | |
|---|---|---|---|
| 6,757,482 B1* | 6/2004 | Ochiai et al. .................. 386/278 |
| 8,046,798 B1* | 10/2011 | Schlack et al. .................. 725/46 |
| 2001/0005903 A1* | 6/2001 | Goldschmidt Iki et al. .... 725/50 |
| 2002/0120931 A1* | 8/2002 | Huber et al. ..................... 725/34 |
| 2003/0009371 A1* | 1/2003 | Gauba et al. .................... 705/10 |
| 2007/0136742 A1* | 6/2007 | Sparrell ........................... 725/32 |
| 2008/0222673 A1* | 9/2008 | Durden et al. .................. 725/25 |
| 2010/0232758 A1* | 9/2010 | Cook et al. ...................... 386/54 |
| 2011/0231869 A1* | 9/2011 | Scheirey et al. ................ 725/16 |
| 2012/0084805 A1* | 4/2012 | Barnes, Jr. ..................... 725/28 |

* cited by examiner

*Primary Examiner* — Bennett Ingvoldstad

(57) ABSTRACT

An exemplary method includes receiving a plurality of data chunks each representative of a distinct portion of a media content program, generating a personalized version of the media content program based on at least a subset of the data chunks and in accordance with one or more of a plurality of personalization factors associated with a user, and providing the personalized version of the media content program for presentation to the user. Corresponding methods and systems are also described.

23 Claims, 9 Drawing Sheets

Personalize "Lost"

Choose Ending:
- ☐ Ending 1
- ☒ Ending 2
- ☐ Ending 3

Character Preferences:
- ☐ Jack
- ☒ Saywer
- ☐ Hurley
- ☐ Kate
- ☒ John

Choose Rating:
- ☒ G
- ☐ PG
- ☐ PG-13
- ☐ R

My Mood:
- ☐ Happy
- ☐ Bored
- ☒ Ticked Off

[ Surprise Me ]

Fig. 6

METHODS AND SYSTEMS FOR GENERATING A PERSONALIZED VERSION OF A MEDIA CONTENT PROGRAM FOR A USER

BACKGROUND INFORMATION

Advances in electronic communications technologies have interconnected people and allowed for distribution of information perhaps better than ever before. To illustrate, personal computers, handheld devices, mobile phones, set-top box devices, and other electronic access devices are increasingly being used to view, download, share, and/or access various types of media content programming.

While a plethora of media content programming is available to users of such access devices, the actual content of such programming is fixed and statically defined by the content provider. However, viewers of a media content program often have divergent interests. Hence, it would be desirable to be able to present personalized versions of the same media content program to each of a plurality of viewers based on the particular preferences of each viewer.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 6 shows an exemplary graphical user interface ("GUI") that may be used to manage one or more personalization factors according to principles described herein.

DETAILED DESCRIPTION OF PREFERRED EMBODIMENTS

Methods and systems for generating a personalized version of a media content program for a user are described herein. As described in more detail below, a media content personalization computing system may be configured to receive a plurality of data chunks each representative of a distinct portion of a media content program, generate a personalized version of the media content program based on at least a subset of the data chunks and in accordance with one or more of a plurality of personalization factors associated with a user, and provide the personalized version of the media content program for presentation to the user.

As described in more detail below, the methods and systems described herein may facilitate generation of a personalized version of a media content program for presentation to a user during a time slot associated with a live transmission of the media content program and/or at any time thereafter. In this manner, as will be described in more detail below, portions of the media content program deemed to be of most interest to the user may be presented to the user, thereby increasing the likelihood that the user will remain attentive during a presentation of the media content program.

As used herein, "media content" may refer generally to any content made accessible by a media content provider subsystem to a media content access subsystem. The terms "media content instance" and "media content program" as used herein may refer generally to any television program, on-demand media program, pay-per-view media program, broadcast media program (e.g., broadcast television program), multicast media program, narrowcast media program, IPTV content, advertisement (e.g., commercial), video, movie, song, or any segment, component, or combination of these or other forms of media content that may be viewed or otherwise experienced by a user. In some examples, the term "media content program" may alternatively refer to any type of media content other than advertisement content.

As used herein, a "data chunk" refers to data representative of a distinct portion of a media content program. Each data chunk may be individually transmitted to a media content access device (e.g., a set-top box device), which may stitch together (e.g., assemble) the data chunks in a particular order and then present the media content program in accordance with the assembled data chunks.

As used herein, a "personalization factor" refers to any factor that may be used to generate a personalized version of a media content program for a particular user. Exemplary personalization factors include, but are not limited to, an interaction profile associated with a user, a user profile associated with the user, a hardware profile of a media content access device associated with the user, a characteristic of the media content program, and a business rule associated with the media content program.

Figure 1:
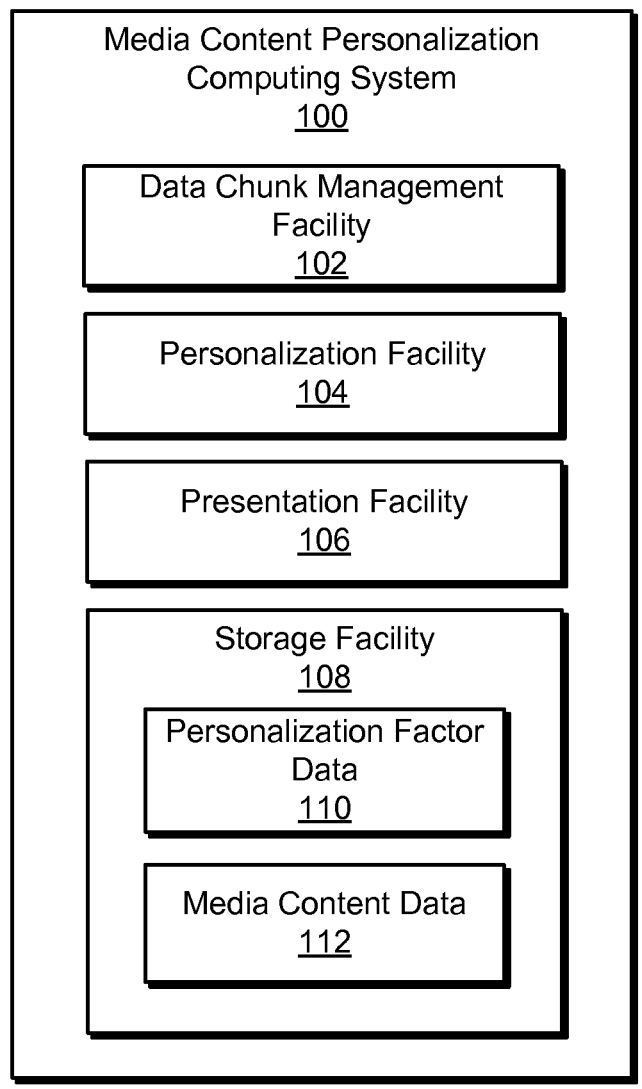
FIG. 1 illustrates an exemplary media content personalization computing system according to principles described herein.

FIG. 1 illustrates an exemplary media content personalization computing system 100 (or simply "system 100"). As will be described in more detail below, system 100 may be configured to facilitate generation of one or more personalized versions of a media content program for one or more users. System 100 may include, but is not limited to, a data chunk management facility 102, a personalization facility 104, a presentation facility 106, and a storage facility 108. Each of these facilities will now be described in more detail.

Data chunk management facility 102 may be configured to manage (e.g., receive, store, maintain, and/or otherwise manage) one or more data chunks. For example, data chunk management facility 102 may be configured to receive a plurality of data chunks each representative of a distinct portion of a media content program. In some examples, data chunk management facility 102 may receive the plurality of data chunks during a live transmission of the media content program in accordance with one or more personalization factors associated with a user. Additionally or alternatively, data chunk management facility 102 may store the data chunks for future playback of the media content program and/or a personalized version of the media content program.

In some examples, as will be described in more detail below, data chunk management facility 102 may be configured to receive one or more additional data chunks representative of one or more other portions of the media content program after the plurality of data chunks are initially received. The one or more additional data chunks may be representative of additional or alternative scenes in the media content program, additional or alternative advertisements to be included in one or more advertisement breaks that are a part of the media content program, and/or any other type of content associated with the media content program as may serve a particular implementation.

Personalization facility 104 may be configured to generate a personalized version of the media content program based on at least a subset of the data chunks and in accordance with one or more of a plurality of personalization factors associated with the user. For example, personalization facility 104 may select data chunks from the plurality of data chunks received by data chunk management facility 102 to be included in the subset of data chunks in accordance with the one or more personalization factors. Personalization facility 104 may then stitch together the selected data chunks in an order specified by the one or more personalization factors. As used herein, "stitching" data chunks together refers to assembling, combining, or otherwise designating a presentation order of the data chunks.

As will be described in more detail below, personalization facility 104 may be configured to dynamically generate the personalized version of the media content program as the plurality of data chunks are received by data chunk management facility 102. In this manner, the personalized version of the media content program may be presented to the user during a time slot associated with a live transmission of the media content program. Additionally or alternatively, personalization facility 104 may generate the personalized version of the media content program after all of the data chunks have been received and stored by data chunk management facility 102. In this manner, the personalized version of the media content program may be updated, added to, or otherwise modified.

In some examples, personalization facility 104 may be configured to generate the personalized version of the media content program implicitly without input provided by the user. In this manner, the personalized version of the media content program may be generated automatically and transparently to the user. Alternatively, personalization facility 104 may be configured to generate the personalized version of the media content program explicitly in response to input provided by the user. Examples of such implicit and explicit generation of a personalized version of a media content program will be described in more detail below.

Presentation facility 106 may be configured to provide media content (e.g., a media content program and/or a personalized version of the media content program) for presentation to a user. For example, presentation facility 106 may be configured to display, provide for display, or otherwise present a media content program, a personalized version of the media content program, and/or one or more options associated with media content (e.g., one or more graphical user interfaces ("GUIs"), one or more options associated with one or more personalization factors, etc.).

Storage facility 108 may be configured to maintain personalization factor data 110 representative of one or more personalization factors and media content data 112 representative of one or more data chunks. It will be recognized that storage facility 108 may maintain additional or alternative data as may serve a particular implementation.

Figure 2:
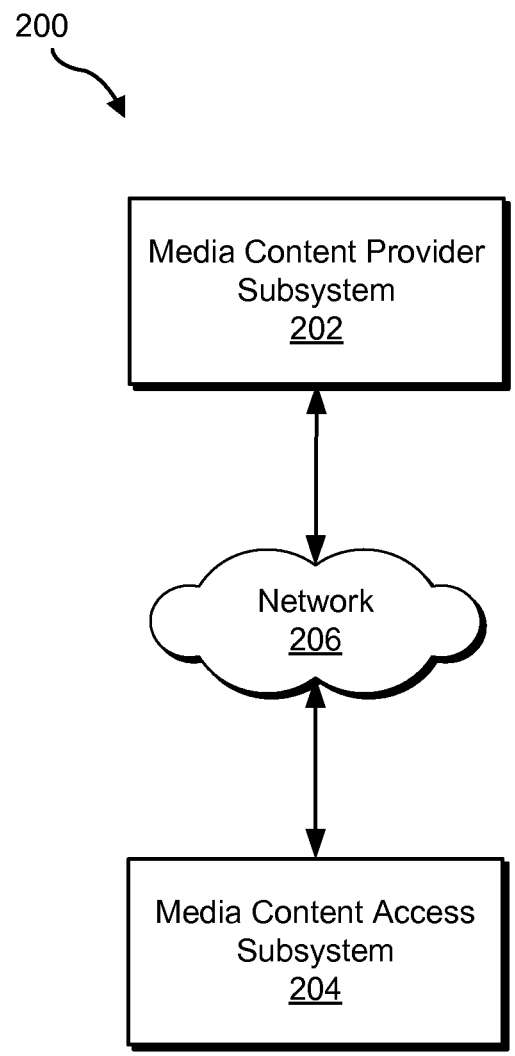
FIG. 2 illustrates an exemplary implementation of the system of FIG. 1 according to principles described herein.

FIG. 2 illustrates an exemplary implementation 200 of system 100 in which a media content provider subsystem 202 (or simply "provider subsystem 202") is communicatively coupled to a media content access subsystem 204 (or simply "access subsystem 204"). Any of the facilities 102-108 may be implemented on one or both of provider subsystem 202 and access subsystem 204.

Access subsystem 204 may be configured to communicate with and receive a signal and/or data stream containing data representative of media content and/or data associated with media content (e.g., data chunks, metadata, program guide data, etc.) from provider subsystem 202. Access subsystem 204 and provider subsystem 202 may communicate using any suitable communication technologies, devices, networks, media, and protocols supportive of remote data communications.

For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

In some examples, provider subsystem 202 may be configured to generate or otherwise provide media content (e.g., in the form of transmitted data chunks) to access subsystem 204. Access subsystem 204 may be configured to facilitate access by a user to media content received from provider subsystem 202. To this end, access subsystem 204 may present the media content for experiencing (e.g., viewing) by a user, record the media content, and/or perform any other operation associated with the media content as may serve a particular implementation.

Figure 3:
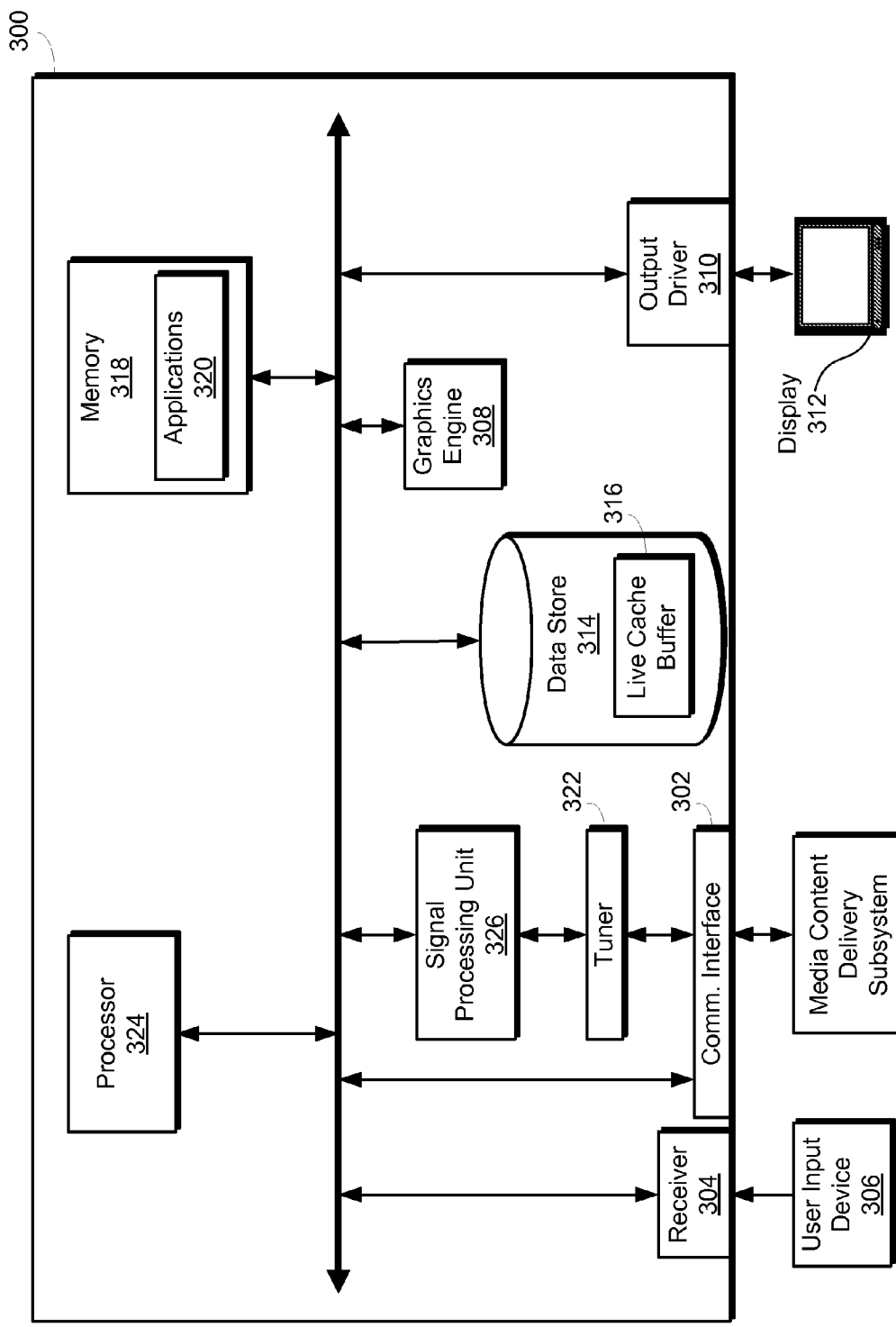
FIG. 3 illustrates an exemplary media content access device according to principles described herein.

Access subsystem 104 and/or components of access subsystem 104 may be implemented as may suit a particular implementation. FIG. 3 illustrates an exemplary media content access device 300 (or simply "device 300") having access subsystem 104 implemented thereon. Device 300 may include one or more of the components of access subsystem 104 shown in FIG. 3 and may be configured to perform one or more of the processes and/or operations described herein. Device 300 may include, but is not limited to, a set-top box device, a DVR device, a multi-room DVR device, a media content processing device, a communications device, a mobile device (e.g., a mobile phone device), a handheld device, a personal computer, a phone device, a personal-digital assistant device, a gaming device, a television device, and/or any device configured to perform one or more of the processes and/or operations described herein.

As shown in FIG. 3, device 300 may include a communication interface 302 configured to receive media content and/or data (e.g., personalization factor data, GUI data, and/or any other data associated with media content) in any acceptable format from provider subsystem 202 or from any other suitable external source. Communication interface 302 may include any device, logic, and/or other technologies suitable for receiving signals and/or data representative of media content and/or other types of media content or data. Communication interface 302 may be configured to interface with any suitable communication media, protocols, and formats, including any of those mentioned above.

Device 300 may include a receiver 304 configured to receive user input signals from a user input device 306. User input device 306 may include, for example, a remote control device or any other suitable input device and may be configured to communicate with receiver 304 via a wireless link, electrical connection, or any other suitable communication link.

Device 300 may include a graphics engine 308 and an output driver 310. Graphics engine 308 may be configured to generate graphics to be provided to output driver 310, which may be configured to interface with or drive a display 312. Output driver 310 may provide output signals to display 312, the output signals including graphical media content (e.g., media content and/or program guide media content) generated by graphics engine 308 and to be presented by display 312 for experiencing by a user. For example, output driver 310 may provide data representative of a graphical user interface including a program guide view or a media playback view to display 312 for presentation to the user.

Data store 314 may include one or more data storage media, devices, or configurations and may employ any type, form, and combination of storage media. For example, data store 314 may include, but is not limited to, a hard drive, network drive, flash drive, magnetic disc, optical disc, or other non-volatile storage unit. Media content and/or data associated with media content may be temporarily and/or permanently stored in data store 314.

Data store 314 is shown to be included within device 300 in FIG. 3 for illustrative purposes only. It will be understood that data store 314 may additionally or alternatively be located external to device 300.

Data store 314 may include one or more live cache buffers 316. Live cache buffer 316 may additionally or alternatively reside in memory 318 or in a storage device external to device 300. In some examples, media content data may be temporarily stored in live cache buffer 316 to facilitate recording of media content and/or presentation of media content in one or more trick play modes.

Device 300 may include memory 318. Memory 318 may include, but is not limited to, FLASH memory, random access memory ("RAM"), dynamic RAM ("DRAM"), other suitable computer-readable media, or any combination or subcombination thereof. In some examples, one or more applications 320 configured to run on or otherwise be executed by device 300 may reside in memory 318.

Device 300 may include one or more tuners 322. Tuner 322 may be configured to selectively receive media content carried on a particular content carrier such that the media content may be processed by device 300. In some examples, media content received by tuner 322 may be temporarily buffered, or stored, in the live cache buffer 316. If there are multiple tuners 322, there may be a live cache buffer 316 corresponding to each of the tuners 322.

While tuner 322 may be used to receive certain media content-carrying signals transmitted by provider subsystem 202, device 300 may be configured to receive other types of media content signals (including media content signals and/or program guide data signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of media content signals, communication interface 302 may receive and forward the signals directly to other components of device 300 (e.g., processor 324 or signal processing unit 326) without the signals going through tuner 322. For an IP-based signal, for example, signal processing unit 326 may function as an IP receiver.

Device 300 may include at least one processor, such as processor 324, configured to control and/or perform one or more operations of device 300. Device 300 may also include a signal processing unit 326 configured to process incoming media content. Signal processing unit 326 may be configured, for example, to demodulate and parse encoded digital media content. In some examples, device 300 may include one or more signal processing units 326 corresponding to each of the tuners 322.

Figure 4:
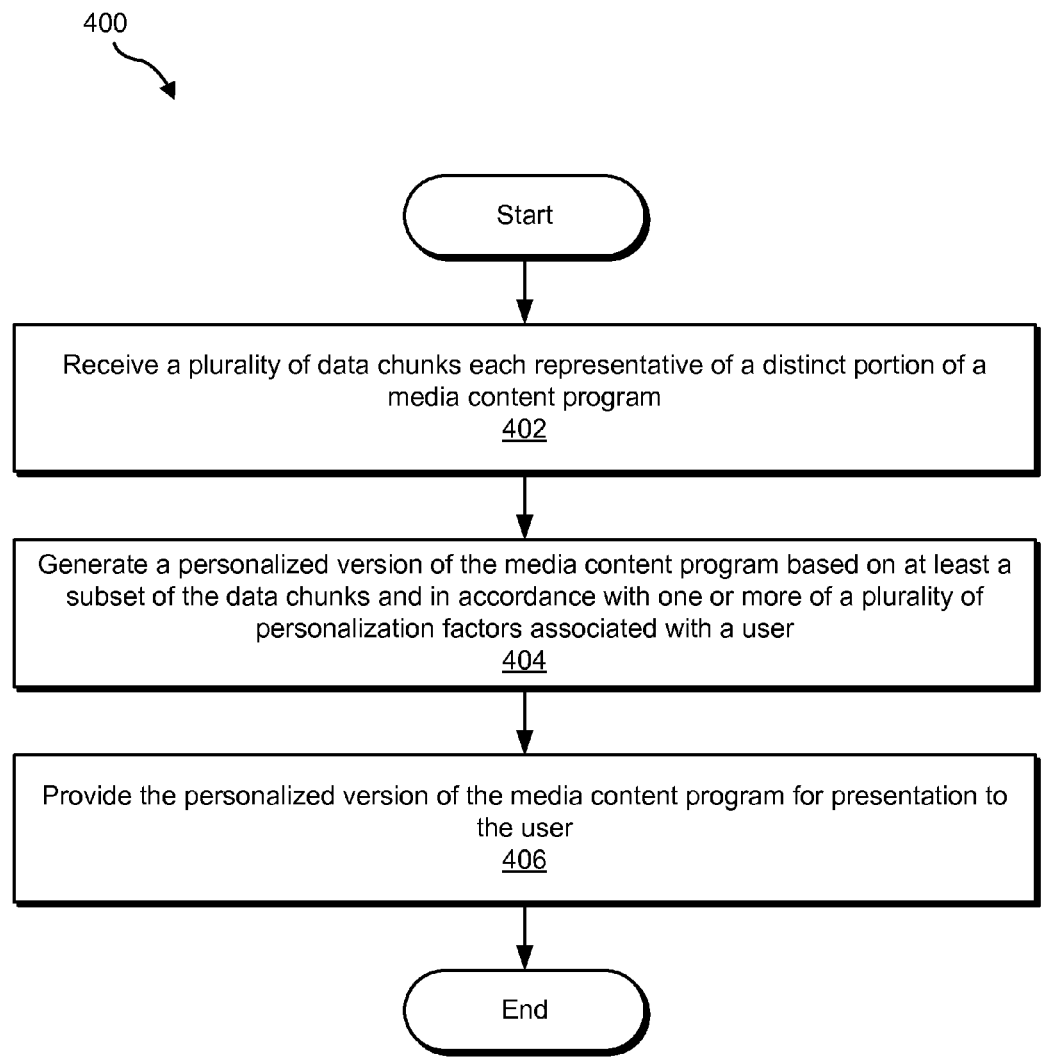
FIG. 4 illustrates an exemplary method of generating a personalized version of a media content program for a user according to principles described herein.

FIG. 4 illustrates an exemplary method 400 of generating a personalized version of a media content program for a user. While FIG. 4 illustrates exemplary steps according to one embodiment, other embodiments may omit, add to, reorder, and/or modify any of the steps shown in FIG. 4. The steps shown in FIG. 4 may be performed by any component or combination of components of system 100.

In step 402, a plurality of data chunks each representative of a distinct portion of a media content program is received. The data chunks may be received in any suitable manner as may serve a particular implementation. For example, system 100 may receive the data chunks during a live transmission of the media content program in accordance with one or more personalization factors associated with a user. Additionally or alternatively, data system 100 may receive the data chunks by recording or storing the data chunks. In some examples, the data chunks are received on demand such that a content provider and/or service provider may only send certain specified data chunks.

In step 404, a personalized version of the media content program may be generated based on at least a subset of the data chunks and in accordance with one or more of a plurality of personalization factors associated with a user. The personalized version of the media content program may be generated in any suitable manner as may serve a particular implementation.

Figure 5:
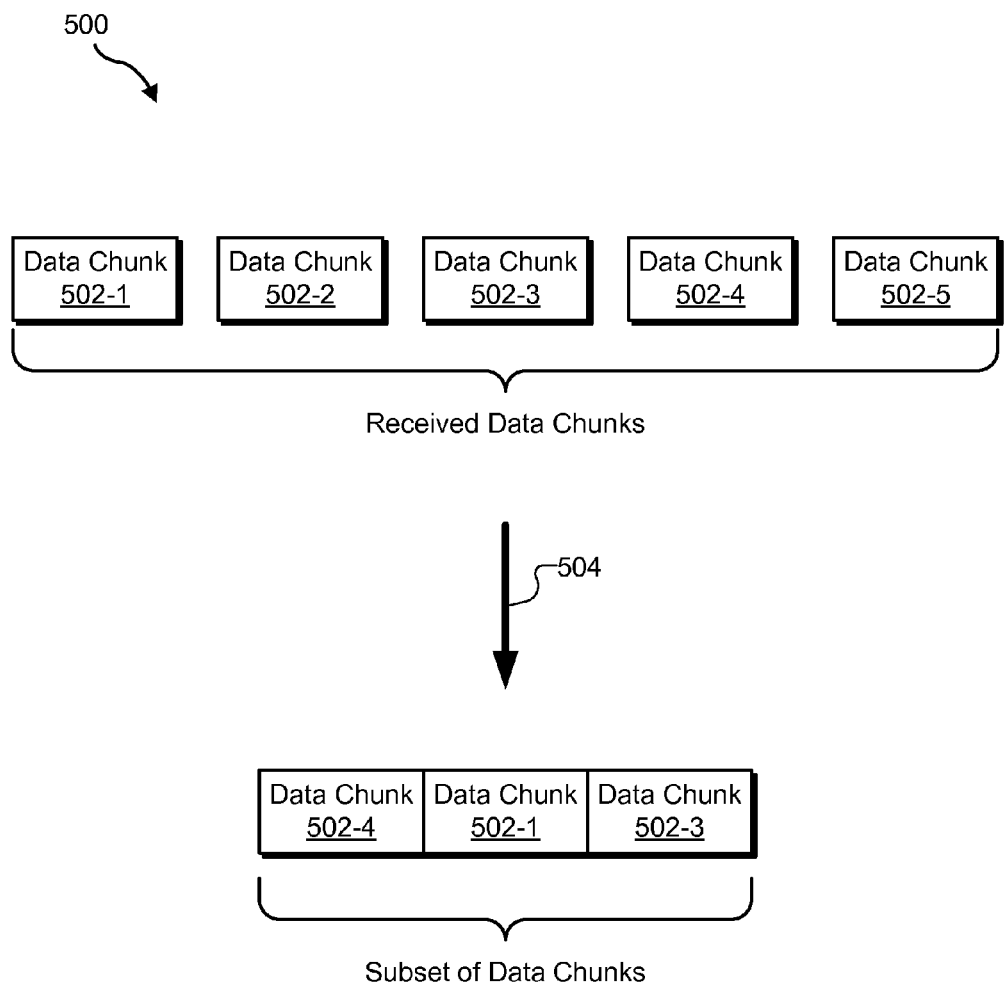
FIG. 5 illustrates an exemplary process of generating a personalized version of a media content program based on a subset of data chunks according to principles described herein.

For example, FIG. 5 illustrates an exemplary process 500 of generating a personalized version of a media content program based on a subset of data chunks. As shown in FIG. 5, a plurality of data chunks 502 (e.g., data chunks 502-1 through 502-5) each representative of a distinct portion of a media content program may be received by system 100. Data chunks 502 may be received by system 100 in any suitable order as may serve a particular application. Additionally or alternatively, one or more of data chunks 502 may be received concurrently by system 100.

As illustrated by arrow 504, system 100 may select some of data chunks 502 to be included in a subset of data chunks that are used to define the personalized version of the media content program. For example, as shown in FIG. 5, data chunks 502-1, 502-3, and 502-4 have been selected to be included in the subset of data chunks. Data chunks 502-1, 502-3, and 502-4 may be selected in accordance with one or more personalization factors. For example, data chunks 502-1, 502-3, and 502-4 may correspond to portions of a media content program that are associated with a particular character in which the user is interested and/or are associated with one or more other personal preferences of the user.

After data chunks 502-1, 502-3, and 502-4 have been selected to be included in the subset, system 100 may stitch data chunks 502-1, 502-3, and 502-4 together in an order specified by the one or more personalization factors. For example, as shown in FIG. 5, data chunks 502-1, 502-3, and 502-4 have been stitched together in the following order: data chunk 502-4, data chunk 502-1, and data chunk 502-3. The order, which may be determined in any suitable manner as may serve a particular application, corresponds to a presentation order in which the media content portions associated with each of the data chunks will be presented to a user.

In some examples, the unused data chunks (e.g., data chunks 502-2 and 502-5) may be stored for later inclusion in another personalized version of the media content program. For example, one or more of the unused data chunks may be used to generate a personalized version of the media content program for another user. Additionally or alternatively, one or more of the unused data chunks may be deleted or otherwise removed.

Process 500 is merely illustrative of the many different processes that may be used to generate a personalized version of a media content program. It will be recognized that other processes may be used as may serve a particular implementation.

Returning to FIG. 4, in step 406, the personalized version of the media content program generated in step 404 is provided for presentation to the user. For example, data representative of the personalized version of the media content program may be stored, transmitted to a display device for display, and/or otherwise maintained by system 100. The presentation may be generated during a time slot associated with the live transmission of the media content program, in response to a user input command (e.g., to view a recorded instance of the personalized version of the media content program), and/or at any other time as may serve a particular implementation.

Various examples of how system 100 may generate a personalized version of a media content program in accordance with one or more personalization factors will now be described. It will be recognized that the examples given herein are merely illustrative of the many different ways in which system 100 may utilize personalization factors to generate a personalized version of a media content program.

In some examples, system 100 may generate a personalized version of a media content program based at least in part on an interaction profile associated with a user. As used herein, an "interaction profile" associated with a user may represent how the user interacts with access subsystem 204 and/or one or more media content instances presented by way of access subsystem 204. The interaction profile associated with a user may be dynamically updated by personalization facility 104 as personalization facility 104 detects the occurrence of one or more "interaction events" performed by or otherwise associated with the user. Such interaction events may include viewing or otherwise accessing media content presented by presentation facility 106, directing access subsystem 204 to perform one or more trick play modes while watching or otherwise accessing media content, and/or otherwise interacting with media content presented by presentation facility 106. In this manner, the interaction profile associated with a user may be dynamically updated over time to reflect how the user interacts with access subsystem 204 and/or one or more media content instances presented by way of access subsystem 204.

An interaction profile associated with a user may be maintained by personalization facility 104 in accordance with any suitable heuristic. In some examples, data representative of detected interaction events, timestamps associated with the detected interaction events, and/or any other data associated with the interaction events (e.g., metadata corresponding to media content being presented during an occurrence of the interaction events) may be processed by personalization facility 104 to generate and/or update the interaction profile. It will be recognized that an interaction profile may correspond to a single user of access subsystem 204 or to multiple users of access subsystem 204 as may serve a particular implementation.

To illustrate, an interaction profile associated with a user may indicate that the user likes to watch television programs that contain fight scenes. Based on this information, personalization facility 104 may select one or more data chunks representative of one or more fight scenes to be included in a personalized version of a media content program being presented to the user and/or being recorded by the user. For example, a particular episode of the television program "Lost" may have a plurality of alternative scenes that may be presented to a user during a particular time slot. The alternative scenes may include a romantic scene, a scary scene, and a fight scene. Based on the interaction profile of a user interested in fight scenes, personalization facility 104 may select one or more data chunks representative of the fight scene and generate a personalized version of the television program "Lost" that includes the fight scene, but not the romantic and scary scenes.

Other tendencies of the user as indicated by the interaction profile may be used by personalization facility 104 to generate a personalized version of a media content program for the user. Such tendencies may include, but are not limited to, one or more media content deletion tendencies, trick play mode tendencies (e.g., the user may have a tendency to skip to different playback positions within a recorded media content program), viewing tendencies (e.g., the user may have a tendency to watch media content programs in the evening and/or on a certain day), and/or any other tendency as may serve a particular implementation.

In some examples, an interaction profile associated with a user of access subsystem 204 may be representative of one or more moods or emotional states of the user. For example, one or more interaction events performed by the user may be associated with a particular mood that the user is in. Similar interaction events detected thereafter may indicate that the user in the particular mood. Personalization facility 104 may accordingly generate a personalized version of a media content program configured to target people in that mood.

Additionally or alternatively, system 100 may generate a personalized version of a media content program based at least in part on a user profile associated with a user. As used herein, a "user profile" associated with a user profile represents one or more personal traits associated with the user that are not already defined within an interaction profile associated with the user. For example, a user profile maintained by personalization facility 104 may include data representative of a user's age, gender, income level, profession, family status, nationality, preferred genre of media content, preferred personnel (e.g., actors, directors, and/or characters), etc.

To illustrate, data chunk management facility 102 may store a plurality of data chunks representative of various portions of a reality television show (e.g., "Survivor") for future playback by one or more users. A sixteen-year-old girl may direct presentation facility 106 to present the recorded reality television show. Personalization facility 104 may recognize that the user is a sixteen-year-old girl (e.g., by way of a login performed by the girl and/or in any other manner) and may automatically select certain data chunks representative of portions of the reality television show in which a typical sixteen-year-old girl may be interested. For example, personalization facility 104 may select data chunks representative of portions of the reality television show that feature certain characters or events in which most sixteen-year-old girls are interested and generate a personalized version of the reality television show based on the selected data chunks. Presentation facility 106 may then provide the personalized version of the reality television show for presentation to the girl.

Subsequently, personalization facility 104 may detect that another user (e.g., the girl's father) having a different user profile has directed presentation facility 106 to present the recorded reality television show. Personalization facility 104 may automatically select other data chunks representative of portions of the reality television show that feature certain characters or events in which most adult males are interested and generate another personalized version of the reality television show based on the selected data chunks. Presentation facility 106 may then provide the other personalized version of the reality television show for presentation to the father.

Additionally or alternatively, system 100 may utilize a hardware profile of a media content access device (e.g., media content access device 300) associated with a user to generate a personalized version of a media content program. For example, personalization facility 104 may determine that the media content access device is associated with a relatively large display screen with relatively high resolution (e.g., a high definition television monitor). Personalization facility 104 may select certain data chunks representative of high resolution content to be included in a personalized version of a media content program to be presented by way of the high resolution display screen. Alternatively, personalization facility 104 may determine that the media access device is associated with a relatively small display screen with relatively low resolution (e.g., a display screen of a mobile phone). Personalization facility 104 may select certain data chunks representative of low resolution content to be included in a personalized version of a media content program to be presented by way of the low resolution display screen.

Additionally or alternatively, system 100 may generate a personalized version of a media content program based at least in part on one or more characteristics of the media content program. Such characteristics may include, but are not limited to, a resolution of the media content program (e.g., standard definition ("SD"), high definition ("HD"), etc.), a rating of the media content program (e.g., an MPAA rating, a critic's rating, a user's rating, etc.), a genre of the media content program, a type of the media content program (e.g., video-on-demand content, broadcast television content, live content, tape delayed content, pay-per-view content, etc.), and/or any other characteristic of the media content program as may serve a particular implementation.

To illustrate, personalization facility 104 may determine that a media content program has an MPAA rating of "R". Personalization facility 104 may generate a personalized version of the media content program for a child that does not include one or more of the R-rated scenes and/or replaces one or more of the R-rated scenes with other scenes having lesser ratings (e.g., "G", "PG", or "PG-13"). Personalization facility 104 may generate one or more other personalized versions of the media content program that have one or more other MPAA ratings as may serve a particular implementation.

Additionally or alternatively, system 100 may generate a personalized version of a media content program based at least in part on one or more business rules associated with the media content represented by the media content data. The one or more business rules may be established by a provider of the media content, a service provider (e.g., a subscription television service provider), and/or any other entity as may serve a particular implementation. For example, a media content provider may specify an expiration date after which scenes represented by one or more data chunks are no longer available, one or more rules specifying particular portions of the media content program that are required to be included in any personalized version of the media content program that is generated by personalization facility 104, and/or any other rule as may serve a particular implementation.

It will be recognized that system 100 may generate a personalized version of a media content program based on any combination or sub-combination of any of the personalization factors described herein. In some examples, each of the personalization factors may be weighted in order to assign various levels of importance to the personalization factors. For example, an interaction profile and a user profile associated with a user may both be weighted and considered by personalization facility 104 when generating a personalized version of a media content program for the user.

In some examples, a personalized version of a media content program may be generated implicitly by personalization facility 104 without input provided by the user. For example, a personalized version of a media content program may be automatically generated in accordance with one or more personalization factors without specific directions provided by the user.

Additionally or alternatively, a personalized version of a media content program may be generated explicitly by personalization facility 104 in response to user input. For example, personalization facility 104 may direct presentation facility 106 to present a GUI configured to facilitate management by a user of one or more of the personalization factors used to generate a personalized version of a media content program. To illustrate, FIG. 6 shows an exemplary GUI 600 that may be used by a user to direct personalization facility 104 to generate a personalized version of a media content program (e.g., "Lost"). As shown in FIG. 6, a user may select a particular ending to be included in the personalized version of the media content program, one or more characters on whom to focus in the personalized version of the media content program (e.g., the personalized version of the media content program may be biased towards a selected character, presented from the selected character's point of view or perspective, or have additional scenes that include the selected character), a rating of the personalized version of the media content program, and/or a mood of the user. Based on the user input provided by way of GUI 600, personalization facility 104 may generate a personalized version of the media content program.

As shown in FIG. 6, GUI 600 may additionally or alternatively include an option 602 configured to present a randomly generated personalized version of a media content instance to a user. For example, in response to a selection of option 602, personalization facility 104 may randomly generate a version of the media content instance that focuses on one or more particular characters, has a particular ending, and/or has one or more other characteristics as may serve a particular implementation.

As mentioned, personalization facility 104 may be configured to dynamically generate a personalized version of a media content program as the plurality of data chunks defining the media content program are received by data chunk management facility 102. In this manner, different personalized versions of the same media content program may be presented concurrently to different users during a time slot associated with a live transmission of the media content program.

Additionally or alternatively, personalization facility 104 may generate a personalized version of a media content program after all of the data chunks defining the media content program have been received and stored by data chunk management facility 102. In this manner, the personalized version of the media content program may be updated, added to, or otherwise modified. One or more other personalized versions of the media content program may also be generated for one or more other users based on the stored data chunks.

In some examples, data chunk management facility 102 may receive another data chunk representative of another portion of a stored media content program after the plurality of data chunks originally defining the media content program are received. Personalization facility 104 may update the subset of data chunks to include the other data chunk and generate an updated personalized version of the media content program based on the updated subset of data chunks.

Figure 7:
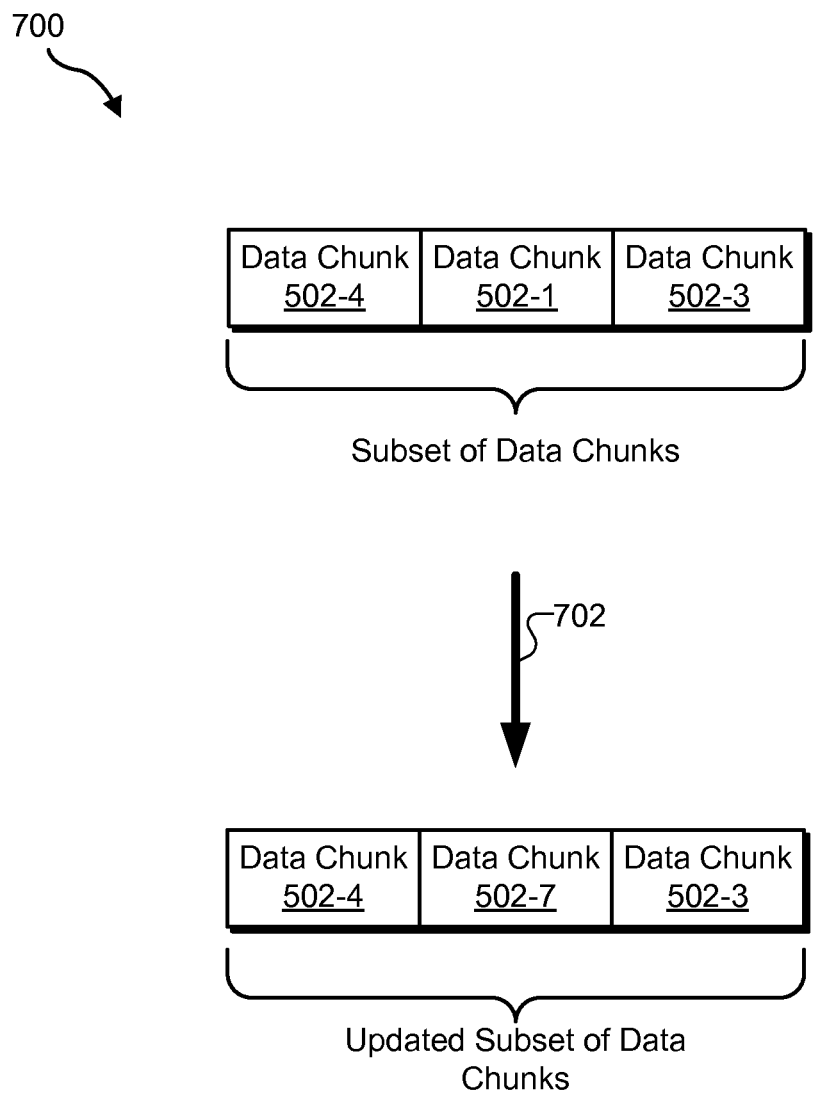
FIG. 7 illustrates an exemplary process of generating an updated subset of data chunks according to principles described herein.

FIG. 7 illustrates an exemplary process 700 of generating an updated subset of data chunks to include another data chunk received by data chunk management facility 102. As shown in FIG. 7, data chunks 502-1, 502-3, and 502-4 may be originally selected by personalization facility 104 to be included in the subset of data chunks used to generate a personalized version of a media content program. Data chunk 502-7 may be subsequently received by chunk management facility 102. Data chunk 502-7 may represent an additional or alternative scene provided by a content provider, a service provider, and/or a user (e.g., user-created media content), an additional or alternative advertisement to be included in the personalized version of the media content program, and/or any other media content instance as may serve a particular implementation.

In some examples, data chunk 502-7 may replace one of the data chunks 502 originally included in the subset of data chunks used to generate a personalized version of a media content program. For example, as illustrated by arrow 702, personalization facility 104 may replace data chunk 502-1 with data chunk 502-7. An updated personalized version of the media content program may then be generated by personalization facility 104 based on the updated subset of data chunks. It will be recognized that data chunk 502-7 may alternatively be added to the subset of data chunks without replacing any of the data chunks included in the subset.

Data chunk replacement, as illustrated in FIG. 7, may be beneficial when a content provider and/or a service provider desires to replace a portion of a media content program that has been recorded and stored by access subsystem 204. For example, a user may record a sporting event (e.g., a sporting event known as the Super Bowl). An event (e.g., a wardrobe malfunction) may occur during the presentation of the sporting event that the content provider and/or service provider desires to permanently delete from recorded instances of the media content program. The content provider and/or service provider may therefore provide one or more alternative data chunks (e.g., data chunk 502-7) and direct personalization facility 104 to automatically replace one or more data chunks (e.g., data chunk 502-1) representative of the event with the one or more alternative data chunks. Such data chunk replacement may be performed automatically and transparently to the user. It will be recognized that data chunk updating (e.g., replacement) may be additionally or alternatively performed in response to user input (e.g., a selection by the user of alternative media content represented by one or more alternative data chunks).

In some examples, personalization facility 104 may "save" (e.g., store) different personalized versions of the same media content program so that a user may selectively access one or more of the saved versions. For example, personalization facility 104 may generate and save personalized versions of the same media content program that have different endings, character perspectives, ratings, and/or other characteristics. A user may then select any of the saved versions for viewing at a later date.

In some examples, a user may share a personalized version of a media content program with another user. For example, a user may direct system 100 to transmit instructions to an access subsystem 204 associated with another user that may be used by access subsystem 204 to generate the personalized version of the media content program.

In some examples, content providers and product vendors (e.g., advertisers) may be provided with an ability to bid for preferred branching (e.g., alternative scenes). For example, a particular alternative scene may be presented as a "preferred ending" to a user based on input provided by a content provider and/or product vendor. Additionally or alternatively, content providers and/or product vendors may be compensated based particular data chunks selected by presentation facility 104, the number of times a personalized media content program is replayed by a user, and/or based on any other factor as may serve a particular implementation.

In some examples, different advertisement content may be associated with and presented to a user depending on the particular personalized version of a media content program that is presented to a user. In this manner, advertisements may be selected that target certain users based on the data chunks that make up the personalized version of the media content program. For example, a personalized version of a media content program that follows an emotional story line may include one or more advertisements targeting women or other groups of viewers likely to be viewing that type of media content program.

Figure 8:
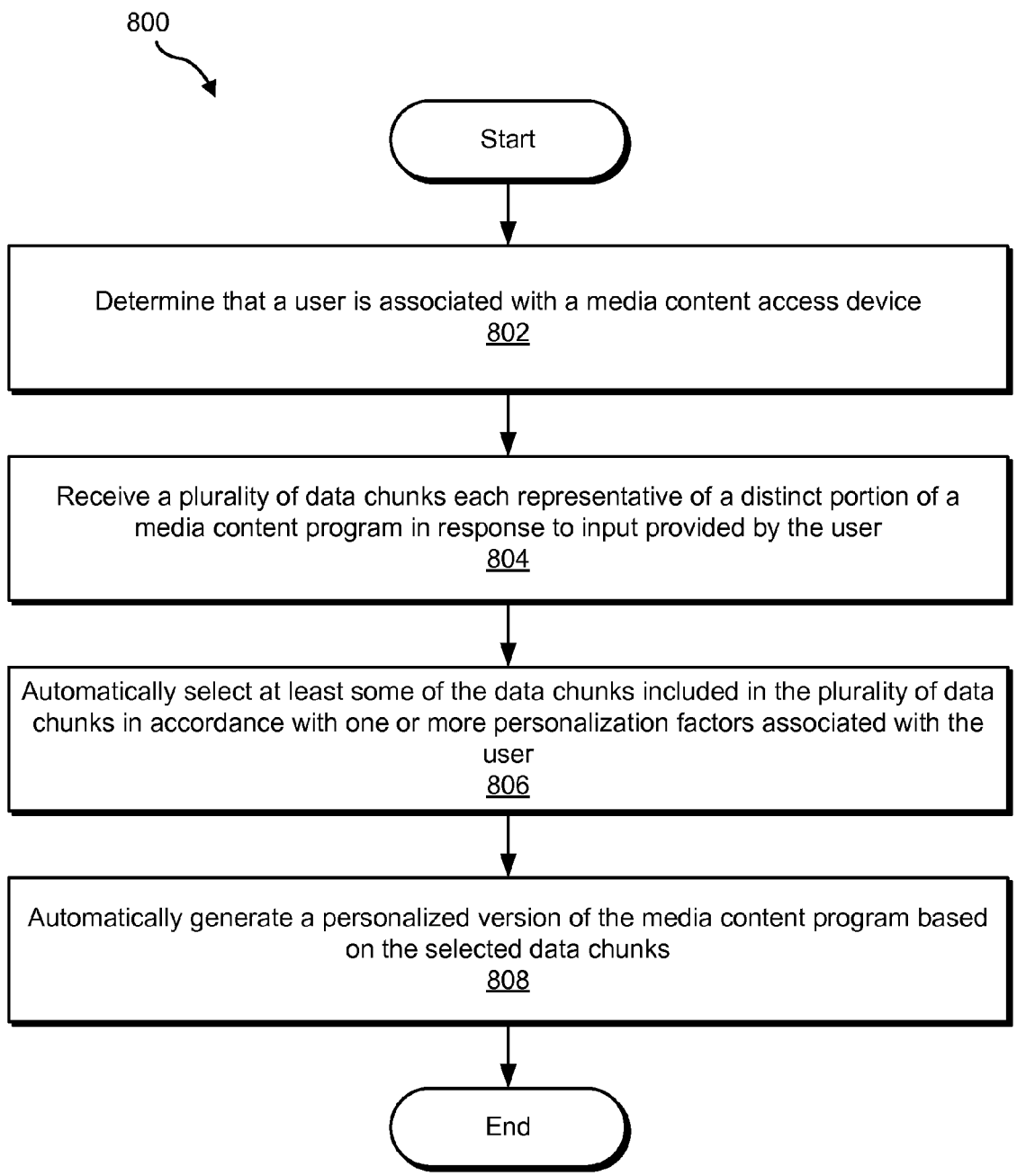
FIG. 8 illustrates another exemplary method of generating a personalized version of a media content program for a user according to principles described herein.

FIG. 8 illustrates another exemplary method 800 of generating a personalized version of a media content program for a user. While FIG. 8 illustrates exemplary steps according to one embodiment, other embodiments may omit, add to, reorder, and/or modify any of the steps shown in FIG. 8. The steps shown in FIG. 8 may be performed by any component or combination of components of system 100.

In step 802, system 100 determines that a user is associated with a media content access device. Step 802 may be performed in any of the ways described herein.

In step 804, a plurality of data chunks each representative of a distinct portion of a media content program are received in response to input provided by the user. The data chunks may be received in any suitable manner as may serve a particular implementation.

In step 806, at least some of the data chunks included in the plurality of data chunks are selected in accordance with one or more personalization factors associated with the user. Step 806 may be performed in any of the ways described herein.

In step 808, a personalized version of the media content program is automatically generated based on the selected data chunks. Step 808 may be performed in any of the ways described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 9:
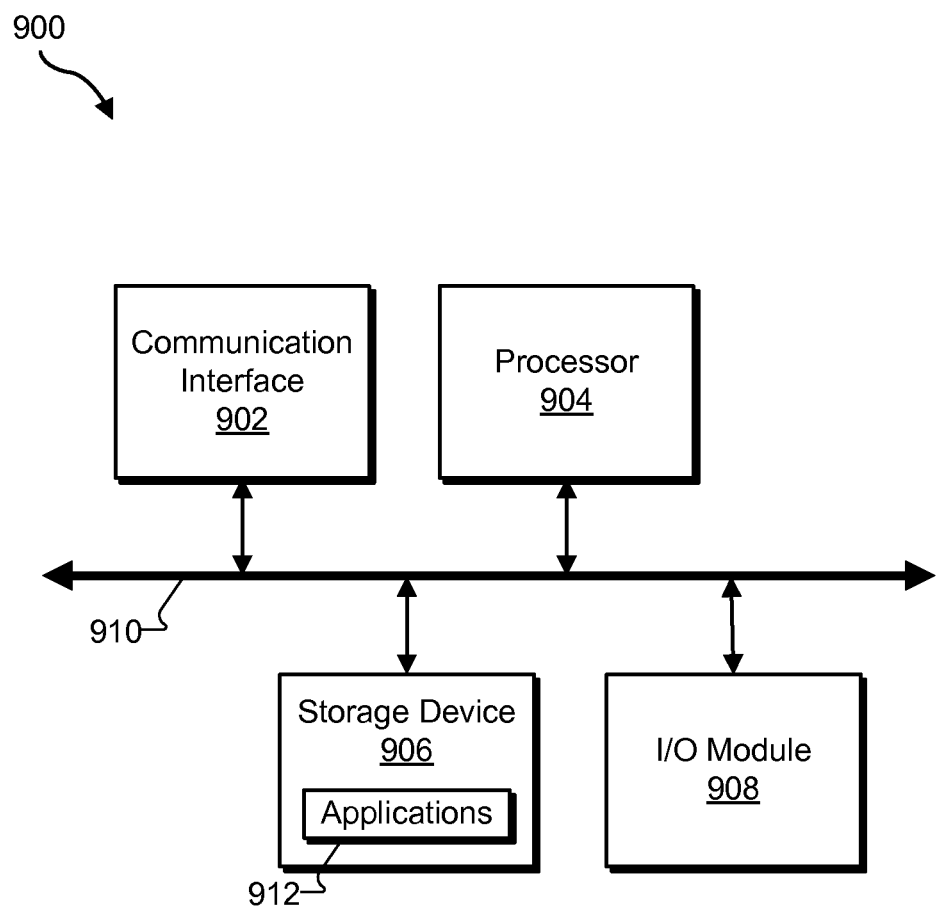
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, and any other suitable interface. Communication interface 902 may additionally or alternatively provide such a connection through, for example, a local area network (such as an Ethernet network), a personal area network, a telephone or cable network, a satellite data connection, a dedicated URL, or any other suitable connection. Communication interface 902 may be configured to interface with any suitable communication media, protocols, and formats, including any of those mentioned above.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another non-transitory computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with data chunk management facility 102, personalization facility 104, and/or presentation facility 106. Likewise, storage facility 108 may be implemented by or within storage device 906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a media content personalization computing system, a plurality of data chunks each representative of a distinct portion of a media content program, the plurality of data chunks comprising a first data chunk and a second data chunk that collectively represent alternative scenes of the media content program;

generating, by the media content personalization computing system based at least in part on one or more interaction events performed by a user with respect to the media content access device, an interaction profile that represents how the user interacts with the media content access device and indicates that the user likes to watch media content programs that contain a particular type of scene;

generating, by the media content personalization computing system, a personalized version of the media content program by selecting a subset of data chunks from the plurality of received data chunks in accordance with the interaction profile that represents how the user interacts with the media content access device and indicates that the user likes to watch media content programs that contain the particular type of scene, the selected data chunks including the first data chunk and not including the second data chunk, and stitching together the selected data chunks in a personalized presentation order specified by the interaction profile that represents how the user interacts with the media content access device; and providing, by the media content personalization computing system, the personalized version of the media content program for presentation to the user in accordance with the personalized presentation order.

2. The method of claim 1, wherein:

the receiving comprises selectively receiving the plurality of data chunks during a live transmission of the media content program in accordance with the interaction profile that represents how the user interacts with the media content access device;

the generating comprises dynamically generating the personalized version of the media content program as the plurality of data chunks are received; and the providing comprises providing the personalized version of the media content program for presentation to the user during a time slot associated with the live transmission of the media content program.

3. The method of claim 1, wherein the receiving comprises storing the plurality of data chunks for future playback of the personalized version of the media content program.

4. The method of claim 1, wherein the generating of the personalized version of the media content program is performed implicitly without input provided by the user.

5. The method of claim 1, wherein the generating of the personalized version of the media content program is performed explicitly in response to input provided by the user.

6. The method of claim 1, further comprising:

receiving, by the media content personalization computing system, an additional data chunk representative of an additional portion of the media content program after the plurality of data chunks are received;

updating, by the media content personalization computing system, the at least a subset of the data chunks to include the additional data chunk; and generating, by the media content personalization computing system, an updated personalized version of the media content program based on the updated at least a subset of the data chunks.

7. The method of claim 6, wherein the updating comprises replacing one of the data chunks included in the at least a subset of the data chunks with the additional data chunk.

8. The method of claim 7, wherein the replacing is performed automatically and transparently to the user.

9. The method of claim 6, further comprising:

receiving, by the media content personalization computing system, input provided by the user indicative of a selection of the additional portion of the media content program;

wherein the updating is performed in response to the selection by the user of the additional portion of the media content program.

10. The method of claim 1, wherein the personalized version of the media content program has at least one of a different rating than the media content program, a different character perspective than the media content program, a different ending than the media content program, and different advertisement content than the media content program.

11. The method of claim 1, wherein at least one of the data chunks included in the at least a subset of the data chunks comprises a data chunk representative of user-created media content.

12. The method of claim 1, further comprising:

generating, by the media content personalization computing system, an additional personalized version of the media content program based on an additional subset of the data chunks and in accordance with one or more of a plurality of personalization factors associated with an additional user; and providing, by the media content personalization computing system, the additional personalized version of the media content program for presentation to the additional user.

13. The method of claim 1, wherein the receiving, generating, and providing are performed by executing computer-executable instructions embodied on at least one non-transitory computer-readable medium.

14. A method comprising:

determining, by a media content personalization computing system, that a user is associated with a media content access device;

receiving, by the media content personalization computing system in response to input provided by the user, a plurality of data chunks each representative of a distinct portion of a media content program, the plurality of data chunks comprising a first data chunk and a second data chunk that collectively represent alternative scenes of the media content program;

generating, by the media content personalization computing system based at least in part on one or more interaction events performed by the user with respect to the media content access device, an interaction profile that represents how the user interacts with the media content access device and indicates that the user likes to watch media content programs that contain a particular type of scene;

automatically selecting, by the media content personalization computing system, at least some of the data chunks included in the plurality of received data chunks in accordance with the interaction profile that represents how the user interacts with the media content access device and indicates that the user likes to watch media content programs that contain the particular type of scene, the selected data chunks including the first data chunk and not including the second data chunk; and automatically generating, by the media content personalization computing system, a personalized version of the media content program by stitching together the selected data chunks in a personalized presentation order specified by the interaction profile that represents how the user interacts with the media content access device.

15. The method of claim 14, further comprising providing, by the media content personalization computing system, the personalized version of the media content program for presentation to the user in accordance with the personalized presentation order.

16. A system comprising:
at least one physical computing device that comprises:
a processor;
a data chunk management facility configured to direct the processor to receive a plurality of data chunks each representative of a distinct portion of a media content program, the plurality of data chunks comprising a first data chunk and a second data chunk that collectively represent alternative scenes of the media content program;
a personalization facility communicatively coupled to the data chunk management facility and configured to direct the processor to
generate, based at least in part on one or more interaction events performed by a user with respect to a media content access device, an interaction profile that represents how the user interacts with the media content access device and indicates that the user likes to watch media content programs that contain a particular type of scene,
generate a personalized version of the media content program by
selecting a subset of the data chunks from the plurality of received data chunks in accordance with the interaction profile that represents how the user interacts with the media content access device and indicates that the user likes to watch media content programs that contain the particular type of scene, the selected data chunks including the first data chunk and not including the second data chunk, and
stitching together the selected data chunks in a personalized presentation order specified by the interaction profile that represents how the user interacts with the media content access device; and
a presentation facility communicatively coupled to the personalization facility and configured to direct the processor to provide the personalized version of the media content program for presentation to the user in accordance with the personalized presentation order.

17. The system of claim 16, wherein:
the data chunk management facility is configured to selectively receive the plurality of data chunks during a live transmission of the media content program in accordance with the interaction profile that represents how the user interacts with the media content access device;
the personalization facility is configured to dynamically generate the personalized version of the media content program as the plurality of data chunks are received; and
the presentation facility is configured to provide the personalized version of the media content program for presentation to the user during a time slot associated with the live transmission of the media content program.

18. The system of claim 16, wherein the data chunk management facility is configured to receive the plurality of data chunks by storing the plurality of data chunks for future playback of the personalized version of the media content program.

19. The system of claim 16, wherein:
the data chunk management facility is configured to receive an additional data chunk representative of an additional portion of the media content program after the plurality of data chunks are received; and
the personalization facility is configured to update the at least a subset of the data chunks to include the additional data chunk and generate an updated personalized version of the media content program based on the updated at least a subset of the data chunks.

20. The method of claim 14, wherein the receiving comprises storing the plurality of data chunks for future playback of the personalized version of the media content program.

21. The method of claim 14, further comprising:
receiving, by the media content personalization computing system, an additional data chunk representative of an additional portion of the media content program after the plurality of data chunks are received;
updating, by the media content personalization computing system, the selected data chunks to include the additional data chunk; and
generating, by the media content personalization computing system, an updated personalized version of the media content program based on the updated selected data chunks.

22. The method of claim 1, wherein the selecting and stitching together are further performed in accordance with one or more personalization factors, wherein the one or more personalization factors comprise at least one of a user profile associated with the user, a hardware profile of the media content access device, a characteristic of the media content program, and a business rule associated with the media content program.

23. The method of claim 1, wherein the one or more interaction events performed by the user with respect to the media content access device comprise one or more of directing the media content access device to record at least one portion of a media content instance, directing the media content access device to access the at least one portion of the media content instance, directing the media content access device to present the at least one portion of the media content instance, and directing the media content access device to perform one or more trick play modes while recording, accessing, or presenting the at least one portion of the media content instance.

* * * * *